Patented July 2, 1929.

1,719,633

UNITED STATES PATENT OFFICE.

MERWYN C. TEAGUE, OF JACKSON HEIGHTS, NEW YORK, ASSIGNOR TO THE NAUGATUCK CHEMICAL COMPANY, OF NAUGATUCK, CONNECTICUT, A CORPORATION OF CONNECTICUT.

PROCESS FOR PRODUCING RUBBER ARTICLES.

No Drawing.     Application filed April 12, 1926.  Serial No. 101,531.

This invention is concerned with an improved method for manufacturing rubber articles, particularly those of the type which are manufactured on a form or supporting body of material.

The object of the invention is to provide an economical rapid method for manufacturing rubber articles from dispersions of rubber by superposing layers of coagulated rubber upon a supporting or shaping form or body, and subsequently drying the rubber.

Another object of the invention is to provide a method whereby rubber articles, particularly those of irregular shape, may be manufactured without recourse to the usual procedures of compounding dry rubber, forming and vulcanizing the articles. Another object of the invention is to provide a method of manufacuring rubber articles which is suited for use with automatic machinery. A further object is to provide a rapid method for the manufacture of rubber goods having great flexibility and water resistance.

Briefly stated the invention consists in coating a form with a rubber dispersion, effecting coagulation of the adhering rubber dispersion, washing the coagulated rubber and subsequently drying the coagulated rubber on the form. The invention also includes repeated coating and coagulating in the manufacture of articles of appreciable thickness.

The invention contemplates the use of inexpensive forms, which may be glass, metal, earthenware (either glazed or unglazed) fabrics and other fibrous materials or any other suitable matrix. The rubber dispersion which may be employed may be the natural rubber latex, with or without a preservative of any desired nature, and concentrated or diluted, or washed, thickened, purified, creamed or otherwise treated. The dispersion also includes artificially prepared latex made by dispersing rubber in any appropriate liquid comprising water. The dispersion may contain ingredients which will cause the rubber to become vulcanized in whole or in part at any desired stage of the process, that is, while in the form of a dispersion, during the drying operation or thereafter. Compounding and coloring ingredients and/or fibrous material may be employed in the dispersion. If desired, vulcanization may be brought about upon the dried articles by causing the latter to absorb all or part of a vulcanizing combination from the surrounding atmosphere.

Although obviously many types of compounding ingredients and vulcanizing agents and combinations are possible in practicing the invention, it is desirable to select those compounding materials etc. which do not react readily with the coagulating agent selected. However, the selection of a coagulating agent which is comparatively inert with respect to some particular ingredient desired to be present in the finished article, permits a wide enough latitude for any purpose. A rubber dispersion containing 35% of solid material will be found quite satisfactory, although other concentrations may be used. Ordinary concentrated latex with or without compounding ingredients or vulcanizing ingredients and combinations may be employed.

In carrying out the process, the form which may be of glass, metal, earthenware or fibres or fabric, is coated with a rubber dispersion by dipping, spraying, painting or in any other suitable manner, and then treated with a coagulant. The form with the adhering coat of rubber is then given a washing treatment in any desirable way. After washing, the form may be again coated with the rubber dispersion, and the several steps repeated until a layer of rubber of the desired thickness has been obtained upon the form. The form may now be immersed in or otherwise treated with a wash water of such nature as to insure complete neutralization of the coagulant. It is preferable, when building up articles by the repeated coating, coagulation and washing operations that the intermediate washings be superficial. By so doing, the form, when it is again coated with rubber dispersion, carries with it a very small amount of the coagulant, so that coagulation of the next layer of rubber is hastened by diffusion of the coagulant from the interior layers of rubber towards the newly applied exterior film. This facilitates a more uniform and immediate coagulation of the latter. It is not necessary to delay between the several operations, for the form may be withdrawn from one bath, dipped into the next, withdrawn and returned to the rubber dispersion as rapidly as may be manually or mechanically possible or desirable. Automatic dipping and/or handling machinery may be employed.

The dispersion should be thick enough or should have sufficient plasticity to make the deposited layer of rubber hold its shape during coagulation, whereby the coagulated layer will be smooth and even. As an illustration of the rate at which the rubber layers build up the following may be cited: With a glass form, the thickness of a dried film made by the above method was 0.035 inches after 4 dips in the rubber latex. After 5 dips the thickness was 0.048 inches, while after 10 dips the thickness of the dried layer was 0.115 inches. By suitably treating the latex, as for example by the addition of materials which will increase the thickness of the latex, and its rate of deposition, the rate of deposit upon the form may be varied as desired. When fabrics or fibrous sheets or bodies are used instead of metallic or non-metallic forms, the rate of deposit is usually more rapid than upon the forms.

Examples of suitable coagulating baths include a solution containing equal parts by weight of glacial acetic acid and water, calcium chloride solution, alum solution, a mixture of acetic acid, alchol and water, or a mixture of acetic acid, alum, alcohol and water. Other coagulating media, such as vapors, solutions of salts, and other means may be employed.

After a sufficient number of coatings with rubber dispersion, and the accompanying coagulating and washing steps, the article is dried on the form, or the fabricated article is dried as a whole, where belts, ropes or sheet fabrics form the base material. Drying intermediate of the coating prevents proper welding of the subsequent layers when vulcanized latex is used. If a vulcanized latex is employed as the rubber dispersion, the article after drying is of course a vulcanized rubber article. It is likewise possible, however, to secure a vulcanized article by the time dryness is reached by including in the dispersion a vulcanizing agent or combination which will vulcanize at the drying temperature.

In applying the invention to the manufacture of footwear, for instance, an overshoe, a form covered with woven or knitted fabric, or with paper pulp if a particularly inexpensive overshoe is to be made, is dipped into a latex composition such, for instance, as the following:

| | Parts by weight. |
|---|---|
| Rubber as latex (containing 3 parts by wt. of sulphur, 1 part by wt. of zinc oxide, ½ part by wt. of glue, 1 part by wt. of sodium dithiobenzoate) | 100 |
| Kaolin | 100 |
| Sulphur | 3 |
| Zinc dimethylamine dithiocarbamate | 1 |
| Glue | 1 |
| Zinc oxide | 1 |

The form is then withdrawn and immersed in a coagulating bath consisting of equal parts of glacial acetic acid and water. Without delay, the coated form is dipped into a washing bath of water which is preferably kept nearly neutral by continual or complete replacement with fresh water. Preferably some of the coagulant is allowed to remain on the layer of coagulated layer to hasten the coagulation of the next layer of rubber. The last is dipped again into the latex, then into the coagulant and then into the wash water. Four such dippings in the latex, followed by the coagulation and washing treatments, will give a dry rubber coating of approximately .04 inches. After the final coagulation, the coated last is washed in an alkaline water to neutralize any remaining coagulant, and is then dried and the rubber shoe removed therefrom, a vulcanized article. The dried shoe consists of vulcanized rubber. The latex and the coagulant may be applied by spraying or painting or in any other desirable manner.

Articles manufactured according to this invention have a high degree of flexibility, and a minimum amount of water absorption. In this latter property they possess an advantage over articles produced by the evaporation of a rubber latex, wherein all of the non-rubber constituents appear in the evaporated rubber, and being water soluble, tend to absorb moisture. In the present invention, those non-rubbers which remain after the coagulation and washing are more thoroughly dispersed through and protected by the rubber phase. Increased flexibility is gained at the same time. Sheets of rubber prepared by the above invention have been found to exhibit tensile strength as high as 3800 lbs. per sq. inch.

The invention is suitable for the manufacture of such articles as gloves, either consisting entirely of rubber or having a fabric portion, footwear, tubing, irregularly shaped objects, such as dolls, toys, and the like, and other rubber articles. The invention, however, is not limited to the manufacture of any particular type of rubber article. It is adaptable to those objects which are prepared upon a form which may be an irregularly shaped rigid body or which may be a fabric. It lies within the scope of the invention to include fabric or fibres or other inserts between successive layers of rubber. This feature is illustrated in the manufacture of automobile inner tubes, where the portion of the tube supporting the valve is fabric-reinforced. Rubber footwear may have fabric inserts as reinforcements, stiffeners, etc.

In the claims the term "rubber dispersion" includes natural or artificial latex or other coagulable rubber dispersions, either vulcanized, vulcanizable or unvulcanized, and compounded or uncompounded. The term "form" comprehends rigid materials, metallic or non-metallic or fabrics or fibrous supporting bodies or sheets.

The invention may be utilized to great advantage in the manufacture of rubberized fibrous materials. Fabric, belting, ropes, cordage and the like may be coated readily and efficiently by this method. The fibrous material may or may not be impregnated with rubber, prior to the deposition of the rubber surfacing thereon. Belting, ropes, and proofed goods thus prepared having a high degree of flexibility, being substantially free from the harshness and stiffness so frequently encountered when rubber coatings are deposited by evaporation methods. The relationship between the rubber phase and the non-rubber phase is altered by the present invention, thus enhancing the flexibility and water-resistance of the rubber coating.

Having thus described my invention, what I claim and desire to protect by Letters Patent is:

1. Process of manufacturing rubber articles which consists in repeatedly coating a form with a rubber dispersion, coagulating the rubber dispersion on the form, washing the coated form after each coagulation operation, and subsequently drying the coagulated rubber on said form.

2. Process of manufacturing rubber articles which consists in alternately coating a form with a rubber dispersion, and immersing the coated form in a coagulant, and drying.

3. Process for manufacturing rubber articles which comprises immersing a form in a rubber dispersion, plunging the coated form into a coagulating bath, washing the coated form, and drying the rubber coating on the form.

4. Process for manufacturing rubber articles which comprises successively immersing a form in a rubber dispersion, a coagulating bath and a washing bath, repeating the cycle of immersions to build up a coating of rubber of the desired thickness, and subsequently drying the rubber.

5. In a process for manufacturing rubber articles by successively immersing a form in a rubber dispersion, a coagulating bath and a washing bath, and repeating the cycle of immersions to build up a coating of rubber on the form, the step of washing away only a portion of the adhering coagulant prior to coating with an additional layer of rubber, thereby facilitating coagulation of the subsequent successive coatings of rubber to be coagulated by diffusion of the remaining coagulant outwardly through the layer of rubber, as well as inwardly by immersion in a coagulating bath.

6. Process of manufacturing rubber articles which consists in repeatedly coating a form with a rubber dispersion and coagulating the rubber dispersion on the form while maintaining it moist, and subsequently drying and vulcanizing the coagulated rubber on said form.

Signed at New York, county and State of New York, this 31st day of March, 1926.

MERWYN C. TEAGUE.